United States Patent
Park et al.

(10) Patent No.: US 10,567,708 B2
(45) Date of Patent: Feb. 18, 2020

(54) SURVEILLANCE SERVER, METHOD OF PROCESSING DATA OF SURVEILLANCE SERVER, AND SURVEILLANCE SYSTEM

(71) Applicant: Hanwha Techwin Co., Ltd., Seongnam-si (KR)

(72) Inventors: Young Joon Park, Changwon-si (KR); Myung Soo Kim, Changwon-si (KR); Su Ho Kwon, Changwon-si (KR); Kyung Don Kang, Changwon-si (KR)

(73) Assignee: Hanwha Techwin Co., Ltd., Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/402,701

(22) Filed: Jan. 10, 2017

(65) Prior Publication Data
US 2017/0118445 A1    Apr. 27, 2017

Related U.S. Application Data

(63) Continuation of application No. 14/341,105, filed on Jul. 25, 2014, now Pat. No. 9,584,767.

(30) Foreign Application Priority Data

Jul. 26, 2013  (KR) .................. 10-2013-0088994

(51) Int. Cl.
| | | |
|---|---|---|
| *H04N 7/167* | (2011.01) | |
| *H04N 7/18* | (2006.01) | |
| *H04L 29/06* | (2006.01) | |
| *H04L 9/00* | (2006.01) | |
| *H04L 9/30* | (2006.01) | |

(52) U.S. Cl.
CPC ........... *H04N 7/1675* (2013.01); *H04L 9/006* (2013.01); *H04L 9/30* (2013.01); *H04L 63/0471* (2013.01); *H04L 63/10* (2013.01); *H04L 63/123* (2013.01); *H04N 7/183* (2013.01)

(58) Field of Classification Search
CPC ...... H04N 7/1675; H04N 7/183; H04L 9/006; H04L 9/30; H04L 63/0471; H04L 63/10; H04L 63/123
See application file for complete search history.

(56) References Cited

U.S. PATENT DOCUMENTS

| | | | |
|---|---|---|---|
| 6,793,128 B2 | 9/2004 | Huffman | |
| 6,968,058 B1 * | 11/2005 | Kondoh | ................. H04N 7/188 348/E7.056 |
| 7,508,941 B1 * | 3/2009 | O'Toole, Jr. | ...... G08B 13/19671 380/228 |
| 7,515,180 B2 * | 4/2009 | Wada | ................. H04N 1/00132 348/207.1 |

(Continued)

FOREIGN PATENT DOCUMENTS

| | | |
|---|---|---|
| KR | 10-2006-0058789 A | 6/2006 |
| KR | 10-2012-0138940 A | 12/2012 |

*Primary Examiner* — Techane Gergiso
(74) *Attorney, Agent, or Firm* — McLean IP Global; Jason Y. Pahng

(57) ABSTRACT

A surveillance server connected to a camera through a network is provided, the camera acquiring an image of a surveillance area. The surveillance server includes: a data acquisition unit configured to acquire from the camera image data of the image that is encrypted; a mode selection unit configured to select a processing mode of the image data; and a decryption control unit configured to decrypt the image data in response to selection of a first mode.

15 Claims, 5 Drawing Sheets

(56) References Cited

U.S. PATENT DOCUMENTS

| | | | |
|---|---|---|---|
| 8,854,465 B1 | 10/2014 | McIntyre | |
| 2003/0109306 A1* | 6/2003 | Karmarkar | G07F 17/32 463/40 |
| 2004/0085445 A1* | 5/2004 | Park | H04N 7/1675 348/143 |
| 2004/0085446 A1 | 5/2004 | Park | |
| 2004/0177251 A1 | 9/2004 | Hayashi | |
| 2004/0196370 A1 | 10/2004 | Yaegashi | |
| 2005/0010763 A1 | 1/2005 | Matsui et al. | |
| 2005/0111660 A1* | 5/2005 | Hosoda | H04K 1/00 380/44 |
| 2005/0175104 A1 | 8/2005 | Honda et al. | |
| 2005/0180595 A1 | 8/2005 | Horii et al. | |
| 2005/0198531 A1 | 9/2005 | Kaniz et al. | |
| 2006/0056625 A1 | 3/2006 | Nakabayashi et al. | |
| 2006/0137018 A1* | 6/2006 | Herschaft | H04N 5/76 726/26 |
| 2006/0171453 A1 | 8/2006 | Rohlfing et al. | |
| 2006/0284977 A1 | 12/2006 | Richardson | |
| 2007/0140487 A1* | 6/2007 | Meier | H04N 7/1675 380/201 |
| 2007/0297607 A1 | 12/2007 | Ogura et al. | |
| 2010/0245072 A1 | 9/2010 | Harel | |
| 2011/0007901 A1* | 1/2011 | Ikeda | H04B 5/02 380/270 |
| 2011/0096168 A1* | 4/2011 | Siann | H04N 7/183 348/158 |
| 2011/0103770 A1 | 5/2011 | Goodman et al. | |
| 2012/0195425 A1* | 8/2012 | Kim | H04L 9/065 380/200 |
| 2013/0156185 A1* | 6/2013 | Kim | H04L 9/08 380/210 |
| 2013/0259228 A1* | 10/2013 | Ren | H04L 9/3247 380/200 |
| 2015/0089241 A1* | 3/2015 | Zhao | H04N 5/335 713/186 |

* cited by examiner

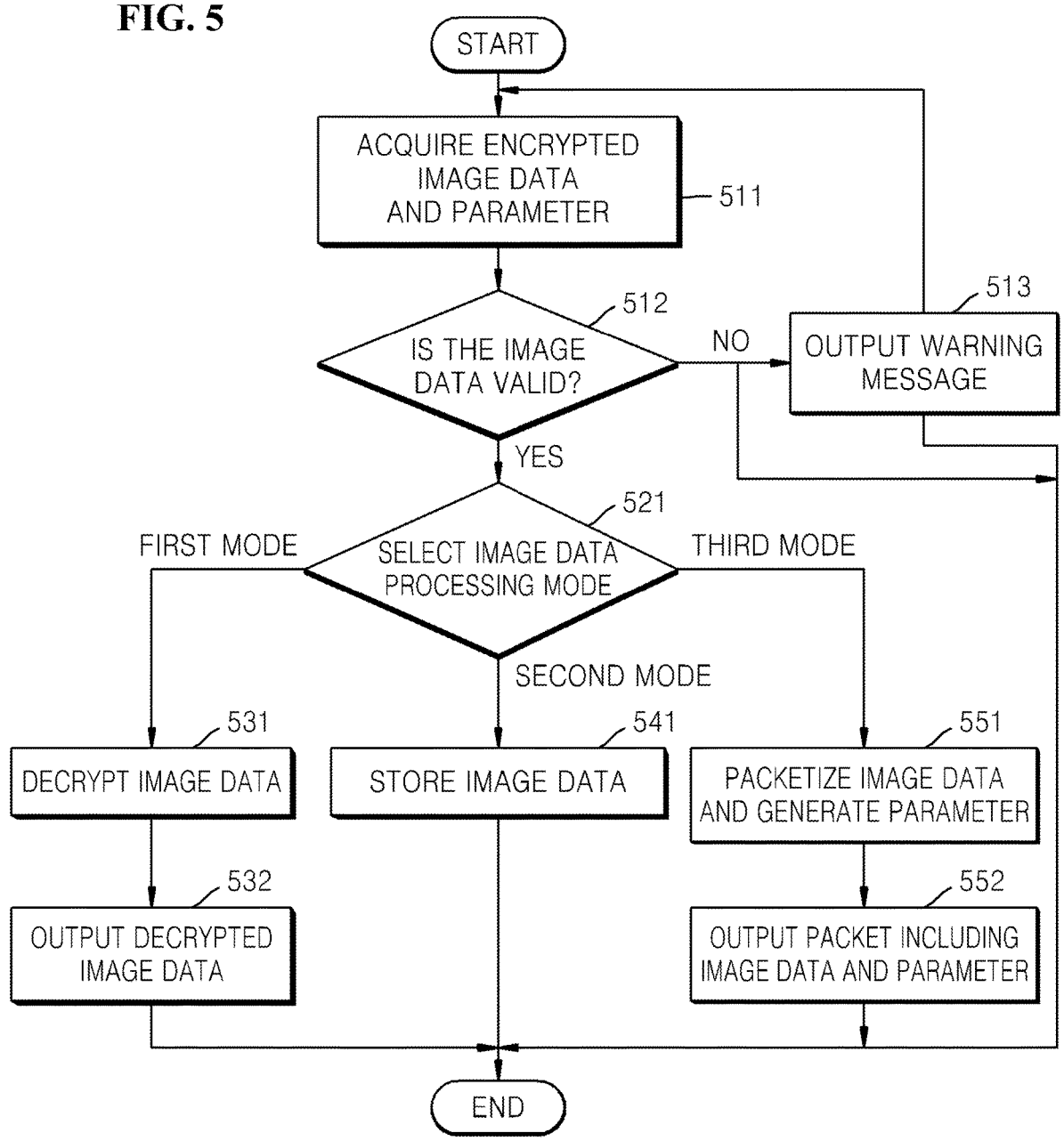

SURVEILLANCE SERVER, METHOD OF PROCESSING DATA OF SURVEILLANCE SERVER, AND SURVEILLANCE SYSTEM

CROSS-REFERENCE TO RELATED APPLICATIONS

This is a continuation of U.S. application Ser. No. 14/341,105 filed Jul. 25, 2014, which claims priority from Korean Patent Application No. 10-2013-0088994, filed on Jul. 26, 2013, in the Korean Intellectual Property Office, the disclosure of which is incorporated herein in its entirety by reference.

BACKGROUND

1. Field

Apparatuses and methods consistent with exemplary embodiments relate to a surveillance server, a method of processing data of the surveillance server, and a surveillance system, and more particularly, to a surveillance server which may control decryption of data according to a data processing mode, a method of processing data of the surveillance server, and a surveillance system.

2. Description of the Related Art

A surveillance system may include network cameras and a server. The cameras and the server are connected through a communication network. Security is important in the surveillance system due to the characteristic of data that are transmitted and received. For example, a third party may intercept or damage data by accessing a network. In the surveillance system, exposure of data or damage of data may cause a serious problem.

Accordingly, there is a demand for a strong security surveillance system which may prevent a third party from accessing data to alter the data and a third party who accesses a network from reading data.

To address the above problems, a method of encrypting data to be transmitted through a network has been suggested. However, a data processing load may increase in the process of encrypting and decrypting data. Also, the data may be exposed in the process of decrypting encrypted data or re-encrypting data.

SUMMARY

One or more exemplary embodiments of the inventive concept provide a surveillance server, a method of processing data of the surveillance server, and a surveillance system.

One or more exemplary embodiments of the inventive concept also provide a computer-readable recording medium having recorded thereon a program for executing the above method.

The inventive concept will be set forth in part in the description which follows and, in part, will be apparent from the description, or may be learned by practice of the exemplary embodiments described herein.

According to an aspect of an exemplary embodiment, there is provided a surveillance server connected to a camera through a network, the camera acquiring an image of a surveillance area. The server may include: a data acquisition unit configured to acquire from the camera image data of the image that is encrypted; a mode selection unit configured to select a processing mode of the image data; and a decryption control unit configured to decrypt the image data in response to selection of a first mode.

In response to selection of a second mode, the decryption control unit may be configured to store the image data without decryption and/or transmit the image data without decryption to a client that is connected to the surveillance server.

The decryption unit may be configured to decrypt the image data by using a second key, the second key may be distinguished from a first key that is used for encryption of the image data, and the first key may be used for authentication of the image data.

The first mode may be a mode of displaying the image on a display device, and the decryption control unit may transmit the image data, which is decrypted, to the display device.

The surveillance server may further include an authentication unit configured to authenticate whether the image data is valid. If it is determined that the image data is authenticated to be valid, the mode selection unit may select a mode of the image data to determine whether to decrypt the image data.

The authentication unit may be configured to authenticate validity of the image data according to whether the image data transmitted by the camera and the image data received by the surveillance server match each other.

The data acquisition unit may be further configured to acquire a first parameter of the image data from the camera, and the authentication unit may be configured to generate a second parameter of the image data from the image data and authenticate the image data according to a result of comparison of the first parameter with the second parameter.

The authentication unit may be further configured to generate the second parameter by using the same method as a method of generating the first parameter.

The first parameter may be generated based on packet information about image data acquired by the camera and the second parameter may be generated based on packet information of the image data acquired by the data acquisition unit.

The first parameter and the second parameter may be generated based on the number of packets of the image data.

According to an aspect of another exemplary embodiment, there is provided a method of processing data of a surveillance server that is connected to a camera through a network, the camera acquiring an image of a surveillance area. The method may include: acquiring encrypted image data of the image from the camera; selecting a processing mode of the image data; and decrypting the image data in response to selection of a first mode.

The first mode may be a mode of displaying the image on a display device, and the method may further include transmitting the image data, which is decrypted, to the display device.

The method may further include authenticating whether the image data is valid. In the acquiring the encrypted image data, a first parameter of the image data may be further acquired from the camera. In the selecting the processing mode, if it is determined that the image data is authenticated to be valid, a mode of the image data may be selected. In the authenticating the image data, a second parameter of the image data may be generated from the image data and the image data may be authenticated according to a result of comparison of the first parameter with the second parameter.

According to an aspect of still another exemplary embodiment, there is provided a surveillance system which may include: a camera configured to acquire image data of a surveillance area and transmitting the image data to a server by encrypting the image data, the server connected to the camera through a network and configured to acquire the image data from the camera, in which the server includes a mode selection unit configured to select a processing mode of the image data, and a decryption control unit configured to decrypt the image data in response to selection of a first mode.

The surveillance system may further include a display device configured to display the image of the surveillance area, in which the first mode may be a mode of displaying the image on the display device, and the decryption control unit may be configured to transmit the image data, which is decrypted, to the display device.

The server may further include an authentication unit configured to authenticate whether the image data is valid, in which the server may be further configured to acquire a first parameter of the image data from the camera, and if it is determined that the image data is authenticated to be valid, the mode selection unit may be configured to select a mode of the image data to determine whether to decrypt the image data, and the authentication unit may be configured to generate a second parameter of the image data from the image data and authenticate the image data according to a result of comparison of the first parameter with the second parameter.

BRIEF DESCRIPTION OF THE DRAWINGS

These and/or other aspects will become apparent and more readily appreciated from the following description of the embodiments, taken in conjunction with the accompanying drawings, in which:

FIG. 5 is a flowchart showing a method of processing data of the server according to an exemplary embodiment.

DETAILED DESCRIPTION OF EXEMPLARY EMBODIMENTS

Figure 1:
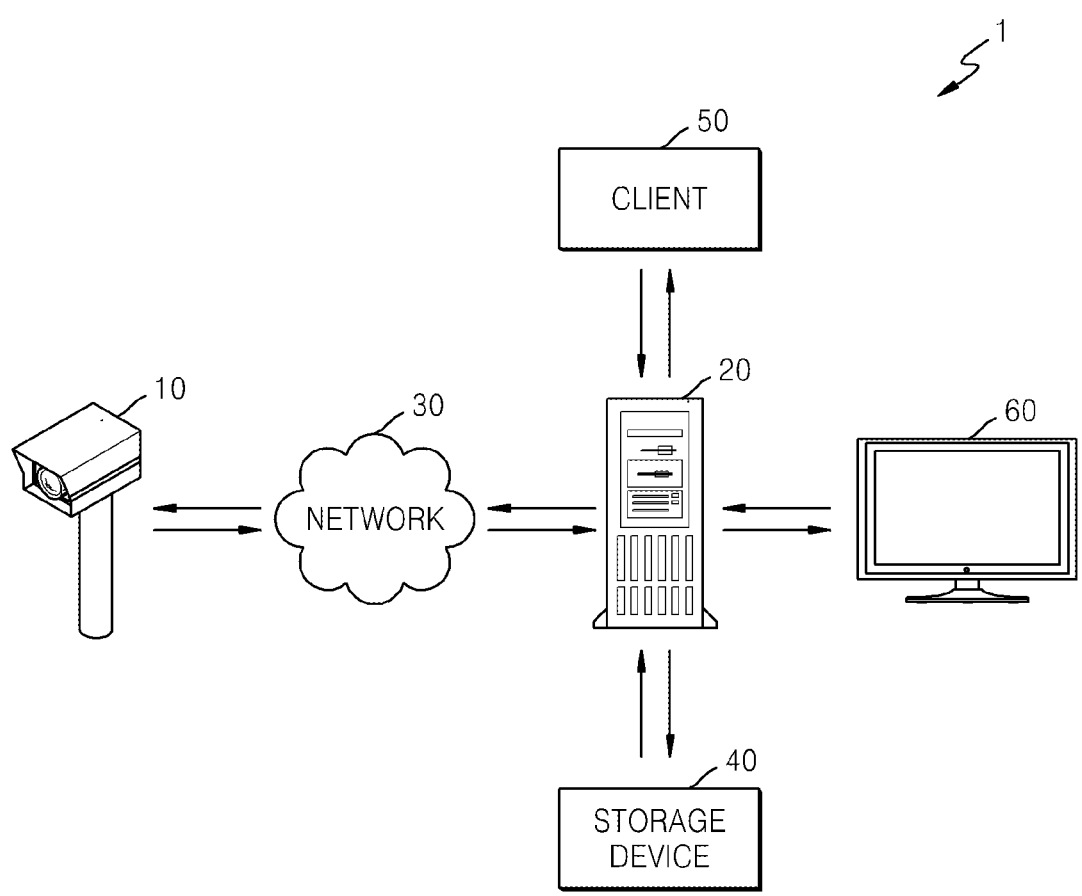
FIG. 1 illustrates a surveillance system according to an exemplary embodiment.

Reference will now be made in detail to exemplary embodiments which are illustrated in the accompanying drawings, wherein like reference numerals refer to like elements throughout. In this regard, the inventive concept may be implemented in different forms and should not be construed as being limited to the descriptions set forth herein. Accordingly, the exemplary embodiments are merely described below, by referring to the figures, to explain aspects of the inventive concept.

Expressions such as "at least one of," when preceding a list of elements, modify the entire list of elements and do not modify the individual elements of the list.

FIG. 1 illustrates a surveillance system 1 according to an exemplary embodiment. Referring to FIG. 1, the surveillance system 1 according to the present embodiment includes a camera 10 and a server 20. The camera 10 and the server 20 are connected through a network 30, such as the Internet, and may exchange data through the network 30.

The surveillance system 1 may further include a storage device 40 for storing data, a client 50, and a display device 60 for displaying an image.

The camera 10 acquires an image of a surveillance area and transmits the acquired image to the server 20 through the network 30. In detail, the camera 10 acquires image data of a surveillance area and transmits the image data to the server 20 by encrypting the image data.

The camera 10 may be a network camera including a network communication unit. The camera 10 may be provided in a multiple number in order to efficiently monitor a surveillance area. The network 30 may be a wired or wireless network.

The image data may be exposed to a third party who accesses the network 30 during a process in which the image data is transmitted or received through the network 30. Accordingly, security of image data is reinforced by encrypting the image data. A well-known encryption algorithm may be used as an image data encryption method. For example, the camera 10 may use an advanced encryption standard (AES) algorithm or a triple data encryption standard (DES) algorithm. Also, the image data may be encrypted by using a symmetric key as a key used for an algorithm.

However, the encryption method of the present embodiment is not limited thereto. It would be understood by those of ordinary skill in the art that the camera 10 may use not only other symmetric key based encryption algorithms but also a public key to exchange a symmetric key that is shared by a data transmission unit and a data receiving unit. The symmetric key may be transmitted and received by being encrypted by a public key for security.

For example, the data receiving unit, for example, the server 20, may acquire a public key, perform authentication with a counterpart, for example, the camera 10, and acquire a symmetric key by decrypting the symmetric key that is encrypted by using the public key. When the symmetric key needs to be updated, a process of decrypting the encrypted symmetric key may be repeated. When the public key needs to be updated, a process of acquiring the public key may be repeated. A case when the public key needs to be updated may be, for example, that the camera 10 connected to the surveillance system 1 is altered, replaced or added. Alternatively, it may be a case when the public key used by the camera 10 may be altered. When the public key is altered, the camera 10 may distribute the public key through the network 30.

In the present specification, the term "key" is used to indicate a data string that is used for an algorithm that encrypts or decrypts data.

A private key may be required in order to decrypt the data that is encrypted by using the public key. In this case, the encrypted data may not be decrypted by using the public key that is used to encrypt the data. Accordingly, even when the encrypted symmetric key is exposed to a third party who accesses the network 30 in a process of transmitting the encrypted symmetric key through the network 30, the third party who does not possess a private key may not decrypt the symmetric key to be used for encryption and authentication of image data.

For example, the camera 10 may encrypt image data by using a first key and the server 20 may acquire encrypted image data and then decrypt the image data by using a second key that is distinguished from the first key. The first and second keys may be the symmetric key. The first key may be used for authentication of the image data at the server 20.

The server 20 acquires encrypted image data from the camera 10 and transmits the acquired image data to another device or stores the same. For example, the server 20 may store the image data in the storage device 40, transmit the image data to the client 50 that is connected to the server 20, or transmit the image data to the display device 60.

On the other hand, referring to FIG. 1 the client 50 is illustrated to be connected to the server 20, but the inventive concept is not limited thereto. For example, the client 50 may be directly connected to the storage device 40 to access data that is stored in the storage device 40 or may be directly connected to the network 30 to exchange data with other devices connected to the network 30.

Figure 2:
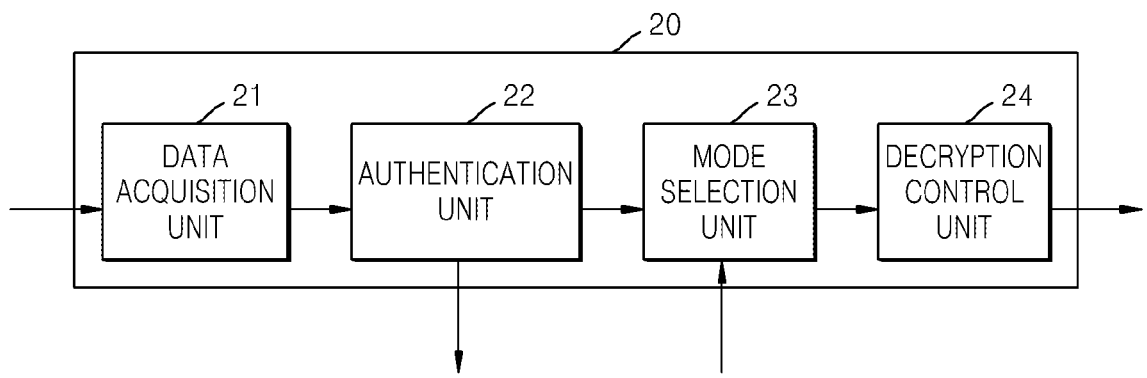
FIG. 2 is a block diagram of a surveillance server according to an exemplary embodiment.

FIG. 2 is a block diagram of the server 20 according to an exemplary embodiment. Referring to FIG. 2, the server 20 according to the present embodiment includes a data acquisition unit 21, an authentication unit 21, a mode selection unit 23, and a decryption control unit 24.

In the server 20 of FIG. 2, only constituent elements related to the present embodiment are illustrated to prevent the characteristics of the present embodiment from being distracted. Accordingly, it would be understood by those of ordinary skill in the art that other common constituent elements than those illustrated in FIG. 2 may be further provided.

The server 20 according to the present embodiment may correspond to at least one processor or include at least one processor. Accordingly, the server 20 may be driven in the form of being included in other hardware such as a microprocessor or a common purpose computer system.

The data acquisition unit 21 may acquire image data, which is encrypted, from the camera 10. The data acquisition unit 21 may acquire the image data through the network 30.

The authentication unit 22 authenticates whether the image data acquired by the data acquisition unit 21 is valid. For example, the authentication unit 22 determines whether the image data transmitted by the camera 10 and the image data received by the server 20 match each other and authenticate validity of the image data according to a result of the determination.

For example, the image data may be attacked by a third party in the process of being transmitted through the network 30. The third party who is accessible to the network 30 may access the image data to alter the image data by removing a partial packet of the image data, inserting a new packet, or copying a partial packet and repeatedly inserting the copied packet. Since altered image data is different from the original data, when the server 20 receives the altered image data and performs surveillance based on the altered image data, the surveillance system 1 may not accurately perform surveillance. For example, information about an intruder of a surveillance area may not be obtained or information about an intruder who does not exist may be obtained.

Accordingly, the authentication unit 22 may determine the image data at a point of time when it is generated by the camera 10 and the image data at a point of time when it is received by the server 20 match each other. When the image data match each other, the image data may be authenticated to be valid.

The mode selection unit 23 selects an image data processing mode. According to an exemplary embodiment, when the image data is authenticated to be valid by the authentication unit 22, the mode selection unit 23 may select the image data processing mode. In the present specification, a mode indicates how to use the image data received from the camera 10. The mode may correspond to a use of the image data.

The decryption control unit 24 may determine whether to decrypt the image data according to the data processing mode selected by the mode selection unit 23. For example, when the data processing mode selected by the mode selection unit 23 is a mode that necessarily requires the decryption of the image data, the decryption control unit 24 may decrypt the image data. In contrast, when the data processing mode selected by the mode selection unit 23 is a mode that does not need the decryption of the image data, the decryption control unit 24 may output the image data without decrypting.

The above control of the decryption control unit 24 may be performed on an application layer that is the top layer of a network communication protocol. When the transmission and reception of the image data is performed on a transport layer that is an intermediate layer, whether to decrypt the image data may not be controlled. However, as the image data is transmitted and received on the application layer, whether to decrypt image data may be controlled. The image data is not unconditionally decrypted and, for example, only the image data that is determined to be decrypted by the decryption control unit 24 may be decrypted.

Figure 3:
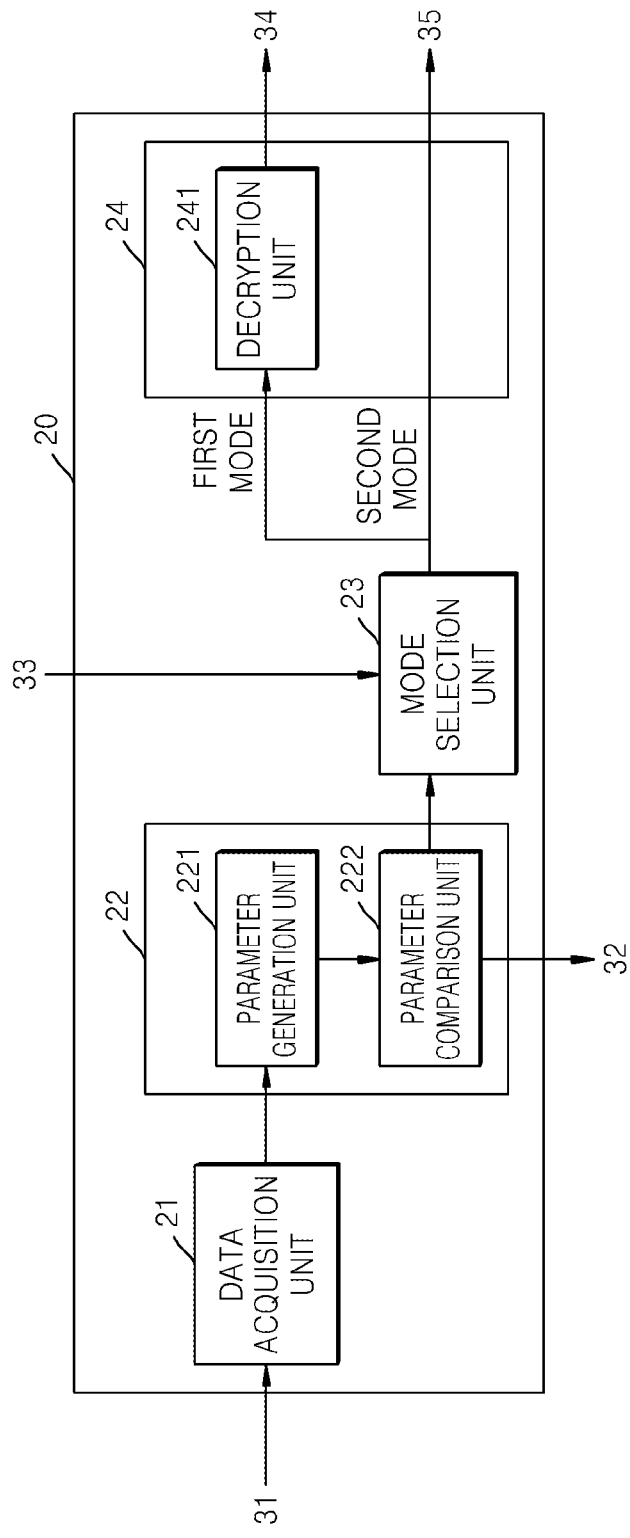
FIG. 3 is a block diagram illustrating the server of FIG. 2 in detail, according to an exemplary embodiment.

FIG. 3 is a block diagram illustrating the server 20 of FIG. 2 in detail. The structure of the server 20 is described in detail with reference to FIG. 3. However, since FIG. 3 illustrates the server 20 of FIG. 2 in detail, the descriptions about the server 20 of FIG. 2, although they are omitted in the descriptions about the server 20 with reference to FIG. 3, may be identically applied to the server 20 according to the embodiment of FIG. 3. Accordingly, the same descriptions as those of FIG. 2 may be omitted.

Referring to FIG. 3, the data acquisition unit 21 acquires image data. The data acquisition unit 21 transfers the image data 31 to the authentication unit 22. The data acquisition unit 21 may further acquire a parameter that reflects characteristics of the image data 31. To this end, when transmitting the image data 31, the camera 10 may generate a parameter, that is, a first parameter, reflecting the characteristics of the image data 31, and transmit the generated parameter with the image data 31. The first parameter may be used to authenticate validity of the image data 31 in the authentication unit 22. The data acquisition unit 21 may transfer the image data 31 and the first parameter to the authentication unit 22.

The authentication unit 22 includes a parameter generation unit 221 and a parameter comparison unit 222. The parameter generation unit 221 newly generates a parameter, that is, a second parameter, that reflects the characteristics of the acquired image data, and transfers a generated second parameter to the parameter comparison unit 222. The parameter generation unit 221 may generate the second parameter in the same method as the method of generating the first parameter.

The parameter comparison unit 222 may compare the first parameter acquired by the data acquisition unit 21 and the second parameter generated by the parameter generation unit 221, and authenticate validity of the image data according to a result of the comparison. According to the present embodiment, the parameter comparison unit 222 authenticates that the image data is valid when the first parameter and the second parameter match each other and that the image data is not valid when the first parameter and the second parameter do not match each other.

Each parameter may be generated based on addresses of the data transmission unit and the data receiving unit, a length of the image data transmitted by being included in a packet, or the number of packets. For example, each parameter may be generated based on the number of packets of the image data. The first parameter may be generated based on packet information about the image data acquired by the camera 10 and the second parameter may be generated based on packet information about the image data acquired by the server 20.

When there is an alteration of the image data that is transmitted and received through the network 30 or an alteration of address information of the data transmission unit or the data receiving unit included in the parameter, the first parameter and the second parameter are different from each other.

However, the parameter according to the present embodiment is not limited thereto. When the parameter is generated to recognize an alteration of the image data by reflecting the characteristics of the image data, the parameter may be generated in any method.

According to the present embodiment, the parameter may be a message authentication code (MAC) that is generated by a MAC algorithm for generating a MAC. A key may be input as an input signal of the MAC algorithm. The generated parameter may be transmitted with the image data in a manner similar to transmitting metadata during the transmission of the image data. As such, when a key is used for generating a parameter, the data transmission unit and the data receiving unit may acquire a parameter only when they have a private key for decryption of the parameter. Accordingly, security of the parameter may be maintained.

According to the present embodiment, the number of packets transmitted to the network 30 may be counted by using a counter and used as an input signal of an algorithm for generating a parameter. Accordingly, alteration of the image data, for example, repeatedly insertion of a particular portion, insertion of a new packet, or removal of some packets, may be detected through authentication using the parameter.

The maximum output of the counter may be set to be sufficiently large. For example, the counter may be 48 bits or more.

As such, the authentication unit 22 may determine whether the image data transmitted by the camera 10 and the image data received by the server 20 are congruous with each other through comparison of the parameters. When the image data are determined to be congruous with each other, the authentication unit 22 may authenticate that the image data is valid.

When the image data is valid, the parameter comparison unit 222 outputs the image data to the mode selection unit 23. When the image data is not valid, the parameter comparison unit 222 may complete the data processing after outputting a warning message 32.

The warning message 32 may indicate that the image data is altered in the transmission and reception process. For example, the warning message 32 may be used to notify alternation of the image data, for example, by being transmitted to a speaker to generate a warning sound or to the display device 60 to display a warning screen to a user.

The mode selection unit 23 selects the image data processing mode. The mode selection unit 23 may receive an input of a signal 33 to select the image data processing mode. The signal 33 may be a control signal that is input by a user. However, the method of selecting the image data processing mode by the mode selection unit 23 is not limited thereto and, for example, the image data processing mode may be selected from the information included in the image data. Alternatively, the mode selection unit 23 may select a mode by using software that is previously programmed to select the image data processing mode according to a predetermined algorithm.

The mode selection unit 23 may select the image data processing mode as a first mode or a second mode. For example, the first mode may be a mode of displaying an image on the display device 60. When the mode selection unit 23 selects the first mode, the server 20 may transmit the image data received from the camera 10 to the display device 60 to display an image corresponding to the image data.

The second mode may be a mode of storing the image data in the storage device 40. When the mode selection unit 23 selects the second mode, the server 20 may store the image data received from the camera 10 in the storage device 40. Alternatively, the second mode may be a mode of transmitting the image data to the client 50. When the mode selection unit 23 selects the second mode, the server 20 may transmit the image data received from the camera 10 to the client 50.

Since the names of the above-described first mode and second mode are given for convenience of explanation, the names are not limited to the above descriptions. For example, although the decryption of image data is required to display an image on the display device 60, the decryption of image data is not necessarily required to store an image in the storage device 40 or transmit an image to the client 50. Accordingly, a mode in which the decryption of image data is required is collectively referred to as the first mode and a mode in which the decryption of image data is not required is collectively referred to as the second mode. As such, in the present embodiment, the meaning of each mode is not limited to a particular example.

For example, the mode selection unit 23 selects the image data processing mode as the first mode or the second mode. The first mode may be a mode that requires the decryption of image data, and the second mode may be a mode that does not require the decryption of image data.

The decryption control unit 24 includes a decryption unit 241. The decryption control unit 24 inputs the image data to the decryption unit 241 when the image data processing mode is the first mode, that is, a mode that requires decryption. The decryption unit 241 outputs image data 34 that is decrypted. The image data 34 that is decrypted may be input to the display device 60. When the image data processing mode is the second mode, that is, a mode that does not require decryption, the decryption control unit 24 directly outputs image data 35 that is encrypted, without inputting the image data to the decryption unit 241.

A variety of operating systems may be mounted on the server 20 according to an exemplary embodiment and the image data processing method may be performed on at least one of these operating systems. An operating system that is mounted on the server 20 may be selected by a user.

Detailed embodiments in which the respective elements of the surveillance system according to the above embodiments process data are described below with reference to flowcharts of FIGS. 4 and 5.

Figure 4:
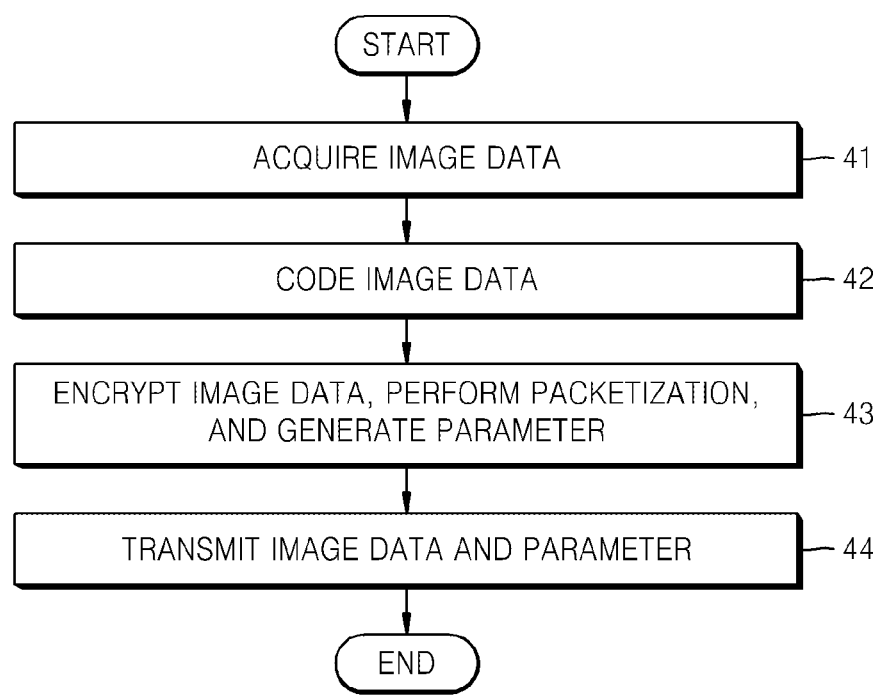
FIG. 4 is a flowchart showing a method of processing data of the camera according to an exemplary embodiment.

FIG. 4 is a flowchart showing a method of processing data of the camera 10 according to an exemplary embodiment.

Referring to FIG. 4, the camera 10 acquires image data in Operation 41. For example, image data obtained by photographing a surveillance area to monitor is acquired by using an image sensor.

In Operation 42, the camera 10 encodes the image data. In detail, in Operation 42, a processor of the camera 10 encodes the image data. The term "encoding" may indicate an operation including compressing image data according to a video encoding standard or compressing image data to reduce data capacity. For example, the camera 10 encodes image data by using a H.264 codec.

In Operation 43, the camera 10 encrypts the image data, performs packetization, that is, converting the image data to the form of a packet available for the transmitting via network 30, and generates the first parameter that indicate the characteristics of the image data. The process of Operation 43 may be performed by the processor of the camera 10. The first parameter of the present embodiment is not limited to information about the characteristics of image data and may further include information about the addresses of the data transmitting unit and the data receiving unit.

In Operation 44, the camera 10 transmits the image data and the first parameter. For example, in Operation 44, the camera 10 transmits the image data and the first parameter to the server 20 through the network 30. The first parameter may be transmitted as a packet by being attached to an end portion of the image data.

The surveillance system according to the present embodiment may be a real-time surveillance system that is operated on a real-time basis. Also, the camera 10 may transmit the image data and the first parameter on a real-time basis.

FIG. 5 is a flowchart showing a method of processing data of the server 20 according to an exemplary embodiment.

Referring to FIG. 5, in Operation 511, the data acquisition unit 21 acquires the encrypted image data and the first parameter from the camera 10.

In Operation 512, the authentication unit 22 authenticates whether the image data is valid. In detail, in Operation 512, the parameter generation unit 221 generates a second parameter from the image data and the parameter comparison unit 222 compares the generated second parameter and the first parameter acquired in Operation 511 and authenticates the image data according to a result of the comparison.

In Operation 512, when the validity of the image data is authenticated, Operation 521 is performed. Otherwise, Operation 513 is performed, the processing of FIG. 5 is terminated, or the processing returns to a standby state. In Operation 513, the authentication unit 22 outputs a warning message and returns to a standby state.

In Operation 521, the mode selection unit 23 selects the image data processing mode. When a first mode is selected in Operation 521, Operation 531 is performed. When a second mode is selected in Operation 521, Operation 541 is performed. When a third mode is selected in Operation 521, Operation 551 is performed.

The meaning of the first to third modes is exemplary. For example, while the first mode may denote a mode that requires decryption of image data, the other modes except for the first mode may denote modes that do not require the decryption of image data.

In Operation 531, the decryption control unit 24 decrypts the image data. In Operation 532, the decryption control unit 24 outputs decrypted image data. The first mode may be a mode of outputting the image data to the display device 60. Accordingly, the image data decrypted in Operation 532 may be output to the display device 60.

In Operation 541, the decryption control unit 24 stores the image data. The image data stored in Operation 541 is image data that is not decrypted. The second mode may be a mode of storing the image data. Accordingly, in Operation 541, the decryption control unit 24 may store the image data as received in the storage device 40 without having to decrypt the image data or de-packetize the packetized image data.

As described above, since the image data stored in the storage device 40 is in an encryption state, even when a third party who does not have a private key for decryption the image data accessed the storage device 40, the third party may not acquire the decrypted image data.

In Operation 551, the decryption control unit 24 does not decrypt the image data, packetizes the image data in an encryption state, and generates a parameter of the image data. In Operation 552, the decryption control unit 24 outputs a packet including the packetized image data and the generated parameter. A signal output in Operation 552 may be transmitted to a new image data receiving unit, for example, the client 50. In Operation 551, the parameter may include the addresses of the image data transmission unit and the image data receiving unit and may indicate the characteristics of the image data.

When the third mode is selected in Operation 521, although it is not limited to FIG. 5, for example, Operation 541 is performed so as to store the image data and then the stored image data is read and Operation 551 may be performed. In this case, in Operation 551, the read image data may be packetized and the parameter may be generated.

The parameter that is generated in Operation 551 may be compared with a new parameter that is generated after the image data receiving unit receives the image data and may be used to authenticate the image data through the comparison. The image data receiving unit may be the client 50.

The flowchart of FIG. 5 includes operations that are time-serially processed by the server 20 of the present embodiment illustrated in FIGS. 2 and 3. Accordingly, it may be seen that the descriptions about the elements of FIGS. 2 and 3, although they are omitted in the following description, are identically applied to the flowchart of FIG. 5.

The method of processing data of a camera and the method of processing data of a server according to the present embodiment illustrated in FIGS. 4 and 5 may be written as a program that is executable in a computer or embodied in a general purpose digital computer for operating the program by using a computer-readable recording medium. The computer-readable recording medium may include storage media, such as magnetic storage media (e.g., ROM, floppy disks, hard disks, etc.) and optical recording media (e.g., CD-ROMs, or DVDs).

The above-described embodiments are described to be applicable to surveillance cameras, surveillance servers, and surveillance systems, but the embodiments may be applicable to a network video recorder (NVR) or a central management system (CMS) and to an embodiment of transmitting and receiving image data through a network.

The above-described embodiments may be used regardless of a codec used for image data and may be performed on a variety of operating system.

For the use of the above-described various modified embodiments, the above-described embodiments may provide graphical user interfaces (GUIs). A user input may be received through a GUI and a modified example in which various user demands are reflected may be provided. For example, a user may input a control signal to GUI in order to select desired strength of security, data encryption strength, and the type of a private key. In addition, the user may input a mode control signal in order to directly select an image data processing mode.

According to the above-described embodiments, the server that receives image data determines whether to decrypt the image data considering the user of the image data without decrypting the image data regardless of the use of the image data. Accordingly, unnecessary decryption and re-encryption processes are reduced. Accordingly, since an unnecessary data processing load decreases, a data processing speed of the server 20 increases.

A data processing amount, a data load, and a data processing speed are important issues in a real-time surveillance system. Accordingly, as the data processing speed of the server 20 increases, a surveillance system may be stably operated accordingly.

In addition, according to the above-described embodiments, as the unnecessary decryption and re-encryption processes are reduced, a possibility of image data being exposed to a third party in the decryption and re-encryption processes decreases so that security of the image data may be enhanced.

In other words, according to the above-described embodiments, since it is possible to omit decryption in an intermediate process in the data processing, security of image data that is stored or transmitted is reinforced. Simultaneously, a performance deterioration problem occurring in an encryption method in an existing kernel layer level may be solved. The performance deterioration may include, for example, an increase of load and waste of resources due to unnecessary encryption or decryption.

According to the above-described embodiments, the server includes the authentication unit and determines validity of image data. The authentication unit determines whether the image data is altered in the process of being transmitted through a network. Accordingly, when a third party intrudes into the network to alter the image data, the server may detect the intrusion and output a warning message or determine that the image data is invalid. Accordingly, the surveillance system may prepare for not only a passive attack to intercept the image data but also an active attack to directly alter the image data. The preparation of a passive attack is achieved through encryption of the image data and the preparation of an active attack may be achieved through the image data authentication process.

As described above, according to the one or more of the above embodiments, since the server that receives encrypted image data may decrypt the image data only when the decryption of the image data is required, a possibility of the image data being exposed in the process of decryption is reduced and security may be reinforced.

According to the above-described embodiments, since the data processing that is required for the unnecessary decryption and re-decryption is omitted, a data processing load of a surveillance system and server may be reduced.

According to the above-described embodiments, since the validity of data is authenticated, reliability of a surveillance system may be improved.

It should be understood that the exemplary embodiments described herein should be considered in a descriptive sense only and not for purposes of limitation of the inventive concept. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A method for protecting image within devices that share a content key, the method comprising:
   receiving, by a server, image data from a camera, the image data being encrypted with the content key;
   determining whether the image data is valid;
   when the image data is determined to be valid, transmitting, by a decryption controller, the image data to a protected device as encrypted without decrypting the image data, the protected device having the content key; and
   when the image data is required to be transmitted to an unprotected device, decrypting, by the decryption controller, the image data with the content key and transmitting the decrypted image data to the unprotected device not having the content key.

2. The method of claim 1, wherein a validity of the image data is determined by verifying whether the image data is transmitted from the camera without alteration.

3. The method of claim 2, wherein the verifying comprises:
   receiving authentication data of the image data from the camera; and
   comparing the authentication data with verification data obtained at the server based on the image data received.

4. The method of claim 1, wherein the unprotected device comprises a display configured to display the decrypted image data.

5. The method of claim 1, wherein the image data is stored as encrypted into the protected device comprising a storage.

6. The method of claim 1, wherein the image data is transferred as encrypted to the protected device comprising a client device.

7. The method of claim 6, further comprising:
   generating authentication data of the image data at the server using an authentication key, the authentication key being shared with the client device; and
   transmitting the authentication data to the client device together with the image data so that the authentication data is to be compared with verification data obtained at the client device to ensure validity of the image data.

8. The method of claim 7, wherein the authentication key is shared between the server and the client device based on a public key infrastructure.

9. A server comprising:
   a memory configured to store a content key;
   a communication unit configured to receive image data in a form of encrypted data from a camera, and selectively transmit the image data to a protected device having the content key, and an unprotected device not having the content key; and
   a processor configured to:
   determine whether the image data is valid;
   when the image data is determined to be valid, transmit, through the communication unit, the image data to the protected device as encrypted without decrypting the image data; and
   when the image data is required to be transmitted to the unprotected device, decrypt the image data with the content key and transmit the decrypted image data to the unprotected device.

10. The server of claim 9, wherein validity of the image data is determined by verifying whether the image data is transmitted from the camera without alteration.

11. The server of claim 10, wherein the processor is further configured to:
   receive authentication data of the image data from the camera; and compare the authentication data with verification data obtained based on the image data received.

12. The server of claim 9, wherein the content key is shared with the protected device based on a public key infrastructure.

13. A camera comprising:
an image sensor configured to capture an image;
a storage configured to store a content key and an authentication key; a communication unit configured to communicate with a server; and
a processor configured to:
  control the image sensor to capture the image;
  generate image data by encrypting the image with the content key;
  generate authentication data based on the authentication key to ensure validity of the image data; and
transmit the image data and the authentication data to the server,
wherein, at the camera, the image data is transmitted as encrypted to a protected interface comprising the server and having the content key; and
wherein, at the camera, the image data is decrypted and transmitted to an unprotected device not having the content key.

14. The camera of claim 13, wherein the validity of the image data is determined, at the server, by comparing the authentication data and verification data obtained at the server based on the image data transmitted from the camera.

15. The camera of claim 13, wherein the content key and the authentication key are shared between the camera and the server based on a public key infrastructure.

* * * * *